United States Patent
Beasley

Patent Number: 5,590,173
Date of Patent: Dec. 31, 1996

[54] DELAY INSENSITIVE BASE STATION-TO-HANDSET INTERFACE FOR RADIO TELEPHONE SYSTEMS

[76] Inventor: Andrew S. Beasley, Box 38, Lake Errock, B.C., Canada, V0M 1N0

[21] Appl. No.: 517,608

[22] Filed: Aug. 22, 1995

Related U.S. Application Data

[63] Continuation of Ser. No. 357,065, Dec. 14, 1994, abandoned, which is a continuation of Ser. No. 924,904, Aug. 5, 1992, abandoned.

[51] Int. Cl.$^6$ ............................................. H04Q 7/20
[52] U.S. Cl. ........................ 379/58; 370/307; 370/280; 370/281
[58] Field of Search ....................... 379/58, 59, 60, 379/61, 63; 370/50, 30, 29, 24, 49.5, 70; 455/182.2, 192.2, 33.1, 54.1

[56] References Cited

U.S. PATENT DOCUMENTS

| | | | |
|---|---|---|---|
| 4,199,660 | 4/1980 | Dill et al. | 370/50 |
| 4,719,619 | 1/1988 | Crookshanks | 370/70 |
| 4,928,272 | 5/1990 | Ohue | 370/50 |

FOREIGN PATENT DOCUMENTS

| | | |
|---|---|---|
| 0158089 | 2/1985 | European Pat. Off. |
| 0421602 | 8/1990 | European Pat. Off. |
| 9100774 | 1/1991 | United Kingdom |
| 9213400 | 8/1992 | WIPO |

OTHER PUBLICATIONS

VP23070 Provisional Data Sheet, VLSI Technology Feb. 1993.

*Primary Examiner*—Curtis Kuntz
*Assistant Examiner*—Michael B. Chernoff

[57] ABSTRACT

A cordless telephone system, employs a remote antenna driver for converting TDD receive signals, broadcast from a cordless handset operating in a TDD (time division duplex) mode, to FDD (frequency division duplex) receive signals and for converting FDD transmit signals into TDD transmit signals and broadcasting the TDD signals to said handset. A base station operates in an FDD mode for supplying the FDD transmit signals to the remote antenna driver and for receiving the FDD receive signals from the remote antenna driver. The base station has a transmit signal path for supplying the FDD transmit signals and a receive signal path separate from the transmit signal path. The transmit signal path includes a timing generator for timing the FDD transmit signals and the receive signal path includes demodulator for demodulating the FDD receive signals symbol synchronizer and bit timer for deriving bit clock timing pulses from the FDD receive signals for controlling the timing of the receive signal path, whereby the timing of the receive signal path is controlled by the handset.

7 Claims, 7 Drawing Sheets

DELAY INSENSITIVE BASE STATION-TO-HANDSET INTERFACE FOR RADIO TELEPHONE SYSTEMS

This application is a continuation of application Ser. No. 08/357,065, filed Dec. 14, 1994, abandoned, which is a continuation of application Ser. No. 07/924,904, filed Aug. 5, 1992, abandoned.

BACKGROUND OF THE INVENTION

1. Field of the Invention

The present invention relates to base station-to-handset interfaces for radio telephone systems, and is useful in particular, but not exclusively, in PCS (personal communications systems) utilizing cable television plants as signal conduits.

The invention may also be employed, for example, in telephone systems utilizing dedicated coaxial cable and/or fiber optic and/or microwave signal conduits.

2. Description of the Related Art

It is expected that PCS microcells will soon be supporting a rapidly increasing number of mobile handsets utilizing time division duplex protocols in North America. To support this user base, it is essential that the PCS-microcells be both low power to assist frequency re-use, and low cost, because the net capital costs of the PCS-microcells will be a major factor in the economic viability of PCS.

It has been suggested by a number of organizations that existing cable television distribution plant be used to interconnect microcell equipment. Taking advantage of the broadband and the nearly ubiquitous nature of cable TV plant, it has been further proposed that the microcell equipment consist of simple RF repeaters that simply translate off-air mobile voice traffic onto the cable plant and vice versa.

It has become apparent in tests that this approach to PCS-microcells yields both low capital costs and improved user service.

In summary, the low cost arises from the combination of simple technology (an RF repeater), using an existing asset base (i.e. cable plant), in a fashion that allows modulation/demodulation and PSTN interface equipment to be centrally located. This allows these equipment costs to be amortised over a very large net coverage area.

The improved service arises from better call blocking probability associated with the ability to centralize the base station equipment rather than a proper allocation to specific microcells. Additionally, the cable plant can act to form distributed antenna arrays that can be shaped into "roamer corridors". Within these roamer corridors it is also possible to control the radio signal dynamic range so as to reduce near user/far user interactions and line of sight blocking.

The cable TV plant supports frequency division duplex (FDD) protocols, but not time division duplex (TDD) protocols. Consequently, prior art systems employ remote antenna drivers (RADs) for effecting FDD-to-TDD conversions and TDD-to-FDD conversions at the microcell serving the TDD handsets, and a remote antenna signal processor (RASP) for effecting the TDD-to-FDD and FDD-to-TDD conversions at a central location.

It is, however, a disadvantage of such a system that a significant time delay occurs in the transmission of the different signals between the base station and the handset, because of propagation delays over the cable TV plant. The handset synchronizes with a local remote antenna driver, as explained in greater detail below, but the base station perceives the receive signals from the handset as arriving late, by approximately twice the above-mentioned delay.

BRIEF SUMMARY OF THE INVENTION

It is accordingly an object of the present invention to provide a novel and improved base station which mitigates this time delay problem.

According to the present invention, a base station for a TDD (Time Division Duplex) cordless telephone system comprises a transmit signal path for supplying FDD transmit signals for transmission to a remote antenna driver and a receive signal path separate from the transmit signal path for processing FDD receive signals received from the remote antenna driver. The transmit signal path includes means for timing the FDD transmit signals and the receive signal path includes a demodulator for demodulating the FDD receive signals and means for deriving bit clock timing and symbol clock timing from the FDD receive signals for controlling the timing of the receive signal path. When this base station is in use, the remote antenna driver exchanges TDD signals with a handset operating in a TDD mode, and exchanges corresponding FDD signals with the base station.

The present base station thus has no transmit-receive switch for alternately connecting the transmit/receive signal paths to a common terminal which is connected to the remote antenna driver. Moreover, the transmit and receive signal paths of the present base station may operate at different frequencies, or alternatively the signal conduit between the base station and the remote antenna driver may have separate paths for the transmit signal and the receive signal, thus reducing isolation issues.

Since the base station derives its receive bit clock timing from the incoming receive signal, the interface according to the present invention is free of the above-mentioned delay issues.

BRIEF DESCRIPTION OF THE DRAWINGS

Further objections features and advantages of the present invention will be more readily apparent to those skilled in the art from the following description of the present invention when taken in conjunction with the accompanying drawings, in which.

DESCRIPTION OF PRIOR ART

Figure 1:
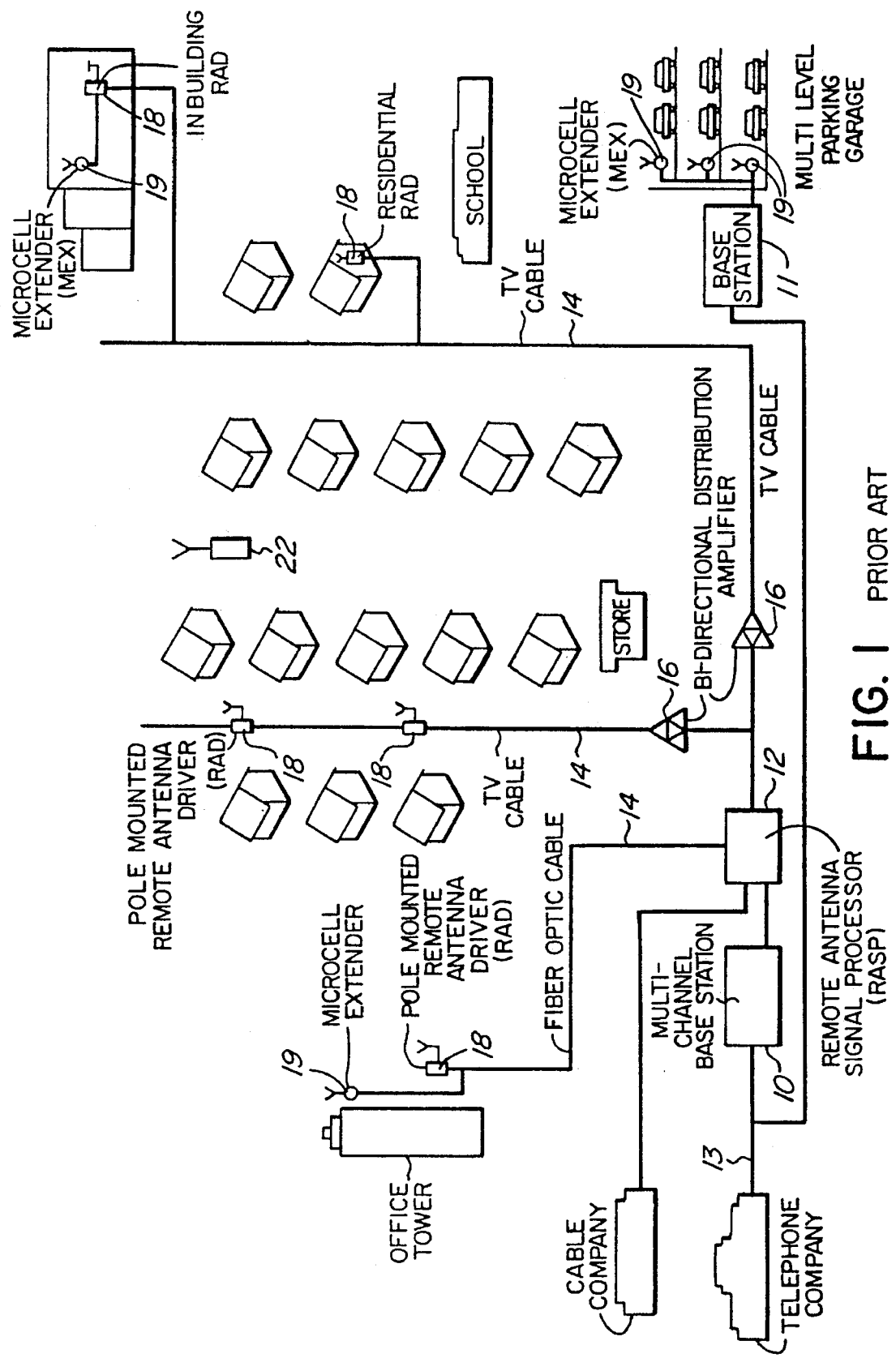
FIG. 1 shows a block diagram of a prior art time division duplex cordless telephone system.

FIG. 1 illustrates the principal hardware elements and concepts of a prior art cordless telephone system.

In the system illustrated in FIG. 1, base stations 10 and 11 operate at the off-air frequencies and perform demodulation and modulation functions for the telephone signals. The base stations 10 and 11 interface directly to PSTN lines 13 and use a time division duplex protocol.

The base stations can be mounted to interface with nearby handsets directly (not shown), or as in the case of the base station 11 through microcell extenders (MEXs) 19 or can be located at a central site, as is the base station 10, where their ability to handle calls can be amortised over a larger network of microcells connected by TV cable plant.

A remote antenna signal processor (RASPs) 12 is located at the central site and interface the base station 10 to a cable plant 14. The RASP 12 serves to convert receive signals from the cable plant 14 from a frequency division duplex (FDD) protocol to a time division duplex (TDD) protocol and also to convert transmit signals, from the base station 10 to the cable plant 14, from a TDD protocol to an FDD protocol.

Typically, signals from the base stations 10 travel over the cable plant 14 to the handset in the 200–450 MHz band, which is the downstream band. Signals travelling in the reverse direction use the 5–30 Mhz return band on the cable plant 14, which is the upstream band. This cable plant is known as a bidirectional plant.

Bi-directional distribution amplifiers 16 need to be compatible with the cable plant 14 and provide return band capability.

RADs 18 pick-up off-air TDD receive signals and relay them back as FDD receive signals to the RASP 12 via the plant's return path, and also receive FDD transmit signals from the RASP 12, convert them into TDD transmit signals and broadcast them as off-air TDD transmit signals to nearby handsets, one of which is indicated by reference numeral 22 in FIG. 1. More particularly, the RADs 18 obtain frequency division duplex transmit signals from the cable TV plant and radiate them as time division duplex signals, and also obtain time division duplex signals from the handsets and send them over the plant as frequency division duplex signals.

The remote antenna drivers (RADs) 18 must be compatible with the TV cable plant 14 and they may be configured for either coaxial cable or fiber optic cable plant.

The microcell extenders (MEXs) 19 use dedicated coaxial or fiber optic cable to enlarge the net coverage zone of one of the RADs 18 or the base station 11. The MEXs 19 represent a cost effective way of "filling gaps" in coverage zones, particularly when there is no in-situ cable plant, e.g. on the different levels of a multi-story car park.

A distributed antenna pattern can be formed by two or more transmitters, that operate synchronously or near synchronously.

The transmitters may be two or more RADs 18 and/or MEXs 19 operating close together, so as to have overlapping coverage zones, and connected to a common cable plant.

The net effect as far as the handset user is concerned is that he can roam in the overlapping coverage zones of these transmitters without any call interruption or the need for any software or hardware processing. This benefit arises directly from the TV cable plant's ability to combine the broadband amplitude and phase of signals, and the handsets ability to transmit to the RADs.

The microcell designer can use such distributed antenna effects to simply increase a coverage zone, to reduce line-of-sight signal blockage, to minimize call hand-off issues, or to minimize dynamic range issues.

The majority of advanced handsets employ a time division duplex (TDD) protocol, in which transmit and receive operations take place on the same frequency, but alternate in time synchronism.

There are numerous examples of TDD handsets, e.g. CT-2, CT-2Plus, CT-3, Omnipoint CDMA.

However, the use of TDD handsets in systems that impose a sizable time delay between a handset and a base station can cause a failure to communicate between the handset and the base station.

Figure 2A:
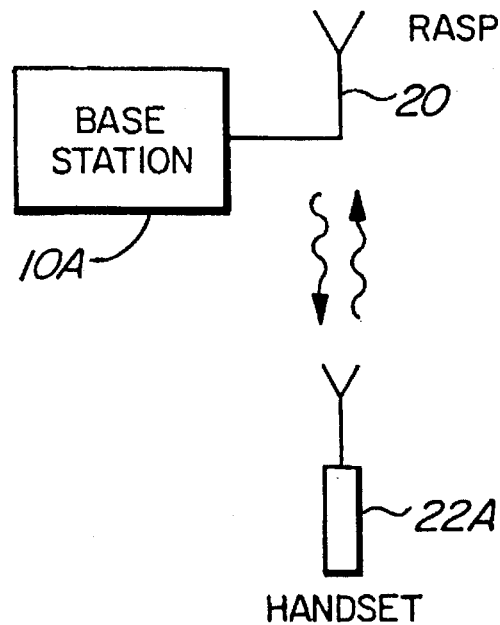
FIG. 2A diagrammatically illustrates a prior art base station communicating directly with a cordless handset.
Figure 2B:
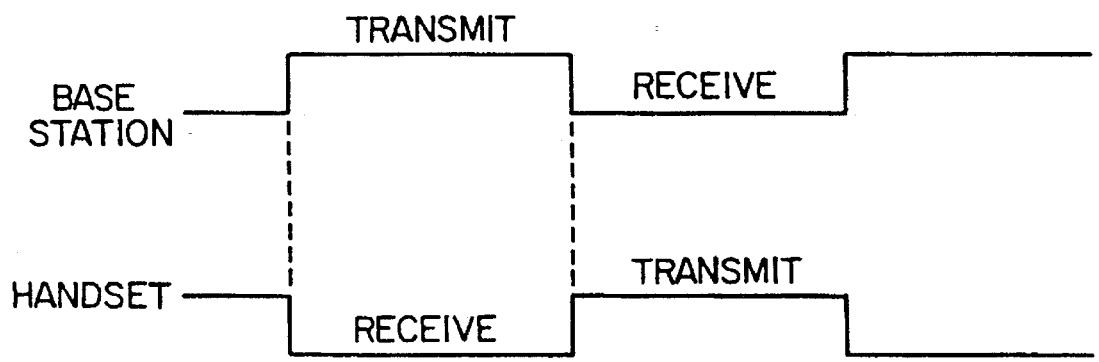
FIG. 2B illustrates the relationship of the transmit and receive signals of the arrangement of FIG. 2A.

Thus, FIGS. 2A and 2B illustrate the relationship of the transmit and receive signals in the case of a base station 10A communicating directly, through an antenna 20, with cordless handset 22A. From FIG. 2B, it can be seen that the transmit and receive signals, at the base station 10A and the handset 22A, alternate with one another. The arrangement is such that the handset 22 synchronises to the timing of the base station 10A.

Figure 3A:
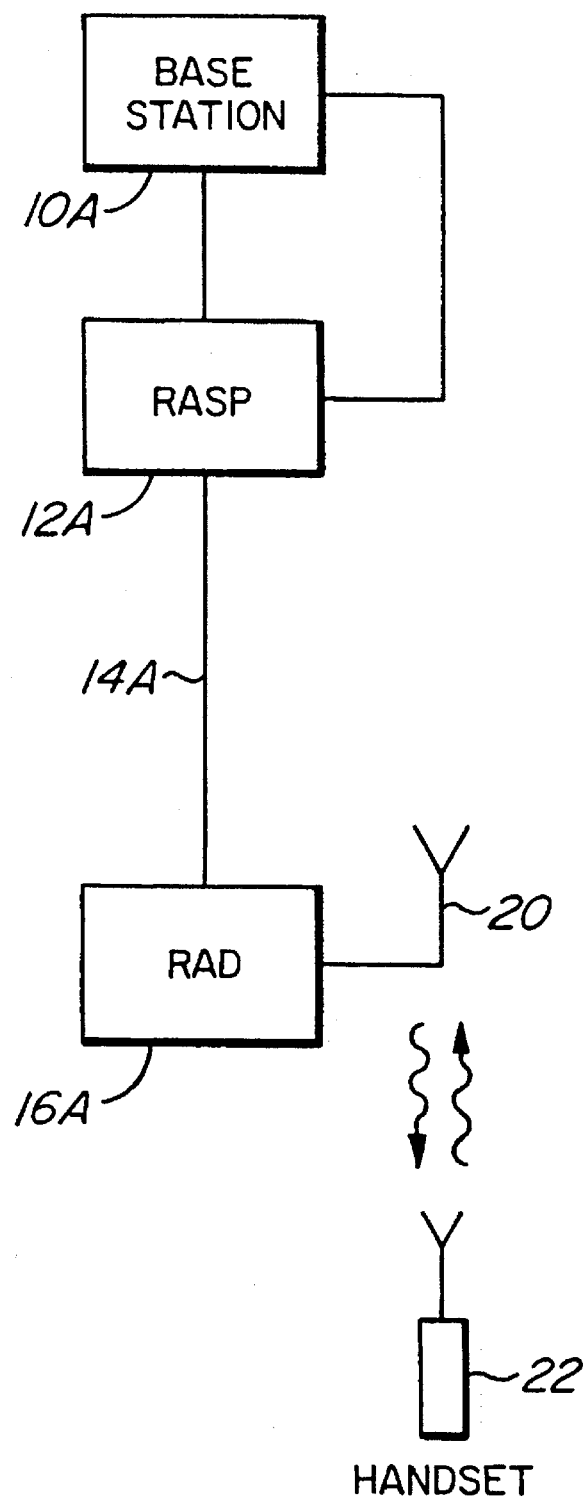
FIG. 3A shows a prior art base station communicating with a handset through a remote antenna signal processor, a dedicated coaxial cable and a remote antenna driver.
Figure 3B:
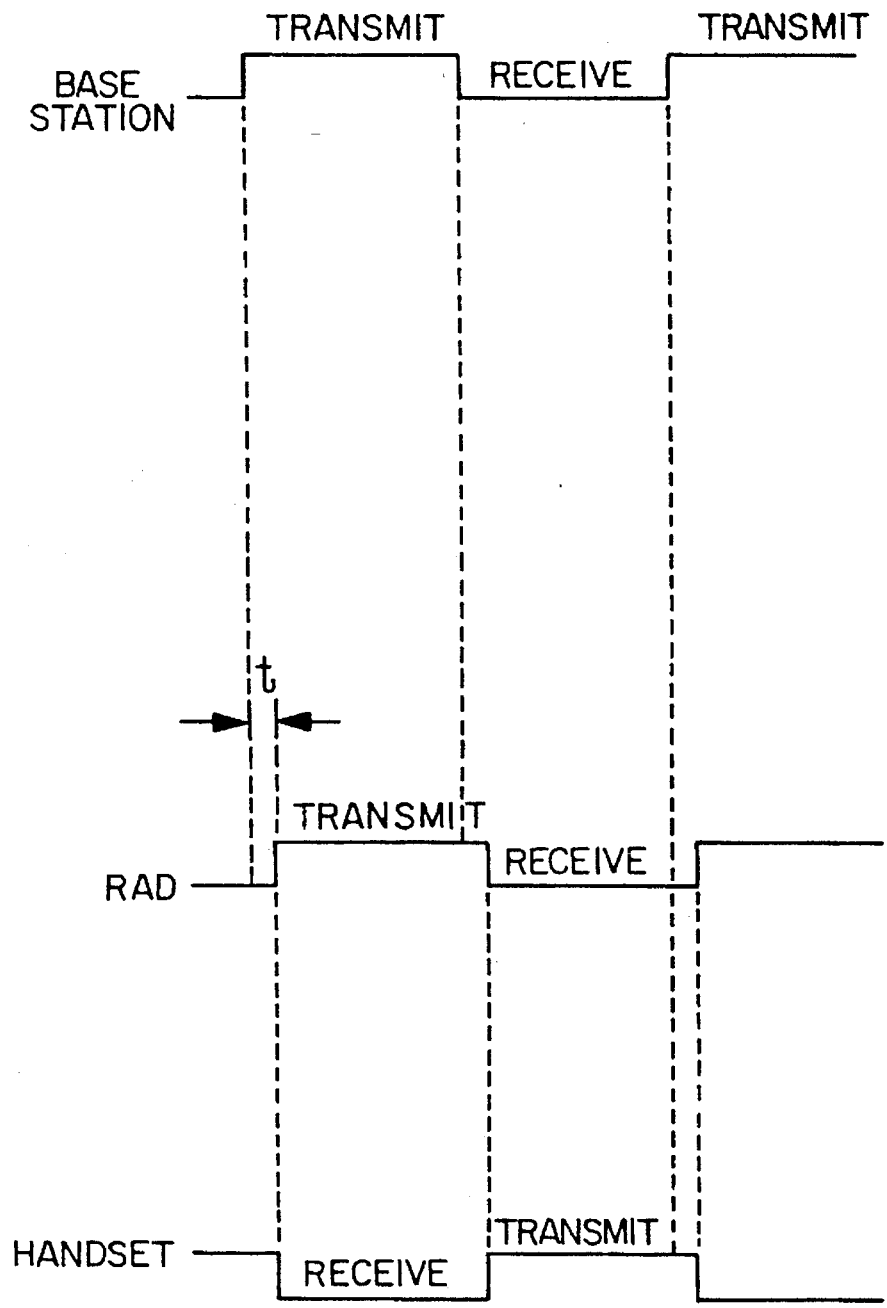
FIG. 3B illustrates a time delay occurring in the arrangement of FIG. 3A.

However, when an RF repeater arrangement comprising a RASP 12A and a RAD 18A are interposed between the base station 10A and the handset 22A, as shown in FIG. 3A, in order to pass the transmit and receive signals through a TV cable plant or other signal conduit 14A, a time delay t (FIG. 3B) is introduced by the signal conduit 14A between the base station 10A and the handset 22A. The handset 22A synchronises with the local RAD 18A, but the base station 10A perceives the receive signals from the handset 22A as arriving late, by approximately twice the cable delay, i.e. $2t$, as illustrated in FIG. 3B.

Prior art base stations employ a switch for alternately connecting transmit signals to the RASP and receive signals, from the RASP, to a demodulator in the base station, the transmit and receive signals having the same frequency.

However, the delay of $2t$ in the reply from the handset 22 typically causes at least one of the following problems for such a prior art base station:

1. A portion of the late reply is irretrievably lost by the base station's transmit-receive switching action;
2. The base station is asked to process a received signal at the same time as transmitting its own signal at an identical frequency. RF isolation issues typically disallow this mode of full duplex operation;
3. The base station's bit sampling clock for incoming signals is misaligned, causing a dramatic increase in errors (i.e. the bit sampling clock is generated from the transmit-receive timing by the base station).

These issues apply for all TDD base stations that support TDD handsets.

DESCRIPTION OF THE PREFERRED EMBODIMENT

According to the present invention, this time delay problem is avoided by omitting the switch from the base station, by separating the transmit and receive signal paths of the base station, by deriving bit clock timing pulses for the receive signal from the handset communicating with the base station and by employing different frequencies or separate signal paths for the RF modulated transmit and receive signals. Consequently, the RASP 12 of the prior art system of FIG. 1 is omitted and the present base station operates completely in a FDD mode, although it serves a handset operating in a TDD mode, as seen through a RAD.

Figure 4:
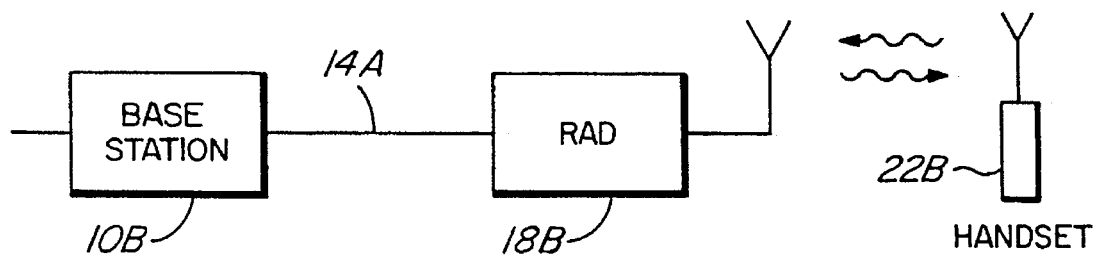
FIG. 4 shows a block diagram of a base station-to-handset interface according to the present invention.

FIG. 4 shows a telephone systems interface according to the present invention.

As shown in FIG. 4, a base station 10B is connected through a cable bidirectional plant 14B to a RAD 18B, which exchanges off-air transmit and receive signals with handsets, one of which is shown and is indicated by reference numeral 22B. The handset 22B incorporates automatic frequency control for correcting the frequency of the off-air signals received by the handset.

Figure 5:
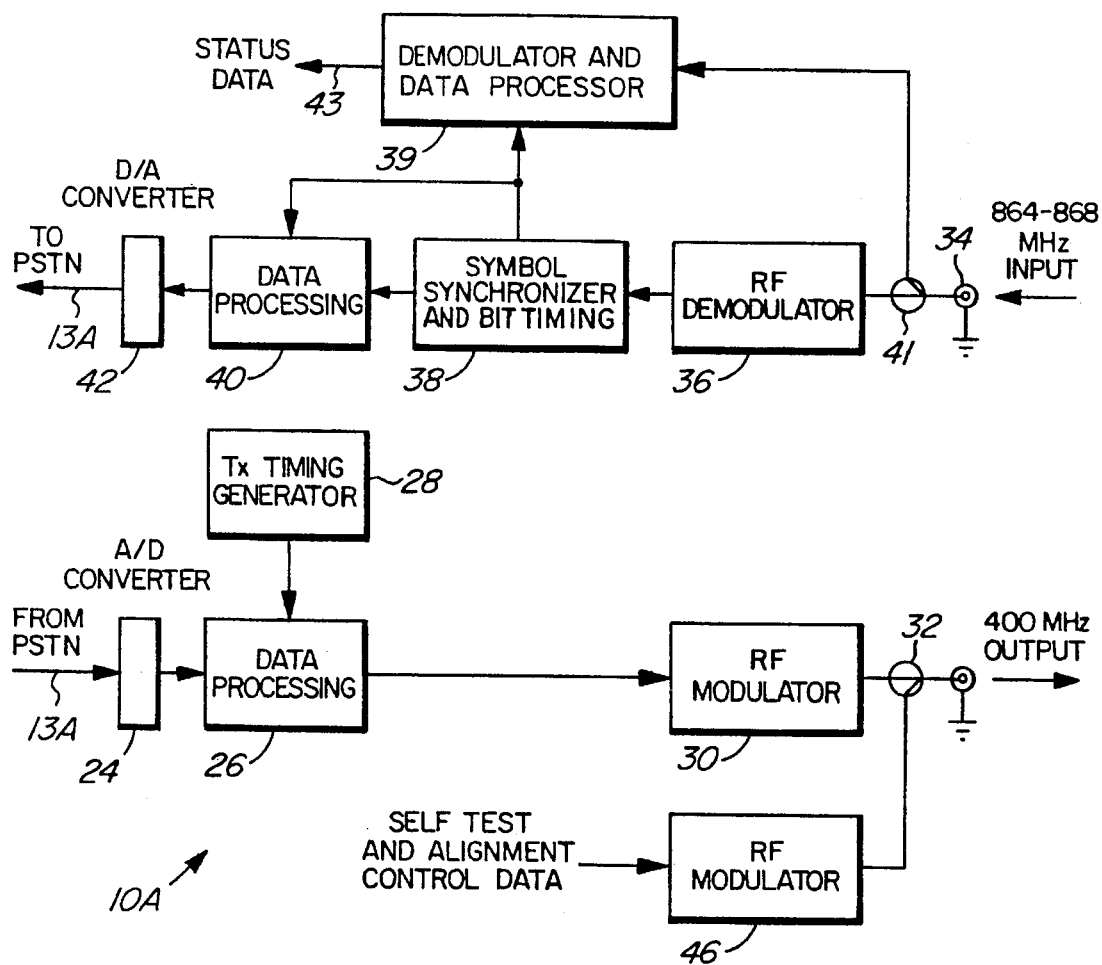
FIG. 5 shows a block diagram of a base station for an interface according to the present invention.

The base station 10B operates in an FDD mode and converts analog transmit signals from PSTN lines 13A FIG. 5 into RF modulated FDD transmit signals, which are supplied through the cable plant 14A to the RAD 18B.

The RAD 18B converts these FDD transmit signals into TDD signals, which are broadcast to the handset. Also, the RAD 18B receives the off-air TDD receive signals from the handset and converts them into FDD receive signals for transmission along the cable plant 14B to the base station 10B.

At the base station 10B, the FDD receive signals are demodulated, processed and converted into analog receive signals, which are supplied to the PSTN lines 13A.

Figure 4A:
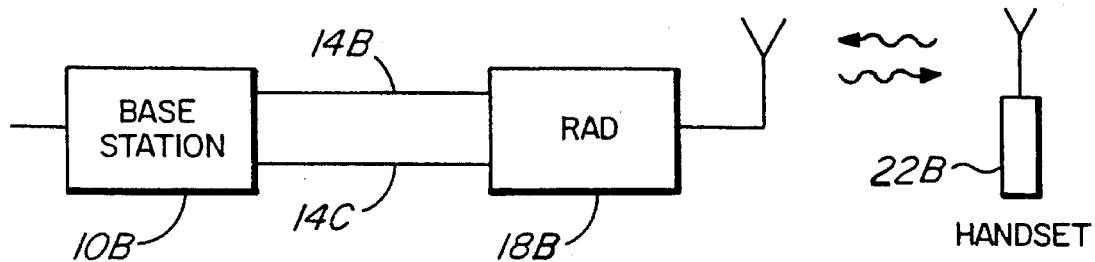
FIG. 4A shows a block diagram similar to that of FIG. 4 but illustrating a modification of the base station of FIG. 4.

FIG. 4A shows a modification of the interface of FIG. 4, in which the single signal conduit which is provided for both the transmit signals and the receive signals between the base station 10B and the RAD 18B in FIG. 4 is replaced by separate signal paths, in the form of two optical fiber signal paths 14B and 14C. In that case, the same frequency can be used for the transmit and receive signals.

As shown in FIG. 5, the base station 10B has an analog-to-digital converter 24, which receives its input from the public switched telephone network (not shown) and provides a digital transmit signal to a data processor 26. The data processor 26 serves to store incoming data and to send out the stored data in high speed bursts, in a manner which is well known in the art and which, therefore, is not described in greater detail herein.

Timing pulses are provided to the data processor 26 from a timing generator 28, and the output of the data processor 26 is supplied to an RF modulator 30, which outputs an RF modulated transmit signal to an output terminal 32, e.g. at 400 MHz, for connection to through a downstream band of the cable plant to one or more RADs (not shown) for off-air broadcasting to a cordless handset 18B.

The RF modulated receive signal from the handset 22, through the RAD and downstream band of the cable plant, is applied as input to an input terminal 34, which is connected to the input of an RF demodulator 36.

The output of the RF demodulator, in the form of a demodulated receive signal, which includes bit clock timing data provided by the handset 22B, is applied to a symbol synchronizer and bit timer 38, which derives the bit clock timing pulses from the receive signal and applies them to a data processor 40. The output of the data processor 40 is converted by a digital-to-analog converter 42 and applied to the public switched telephone network. The data processor 40 serves to process received data so that the voice sound eventually reproduced is continuous instead of occurring in bursts. The manner of operation of the data processor 40 is known in the art and, therefore, is not described in greater detail herein.

In the present embodiment of the invention, the RF modulator 30 has a modulation frequency of 400 MHz, as indicated in FIG. 5, whereas the signal from the handset is modulated at 864–868 MHz. The receive signal path and the transmit signal path thus operate at different frequencies.

The base station 10B also includes a demodulator and data processor 39, which is connected to the terminal 34 through a directional tap 41. The purpose of the demodulator and data processor 39 is to derive data relating, e.g. to the functional condition of the RAD 18B, from a status signal transmitted from the RAD 18B. This status signal is present only when no receive signal is present, and timing pulses are supplied to the demodulator and data processor 40 from the symbol synchronizer and bit timer 38 to effect timing of the former for this purpose. Status data thus derived in supplied on a status line 43.

Also, a further RF modulator 45 is connected to the terminal 32 of the transmit path through a tap 47 for supplying self test and alignment control data to the RAD 18B.

This self test and alignment data may be used, for example, for correcting for plant insertion loss caused by variation in the ambient temperature around the cable plant and for causing the RAD 18B to check its own functional state and/or to check the state of one or more other RADs (not shown) connected to the RAD 18B.

The data processors 26 and 40, the timing generator 28 and the symbol synchronizer and bit timer 38 are implemented as a single microprocessor marketed under Part No. VP23070 by VLSI Technology Inc., of San Jose, Calif.

Figure 6:
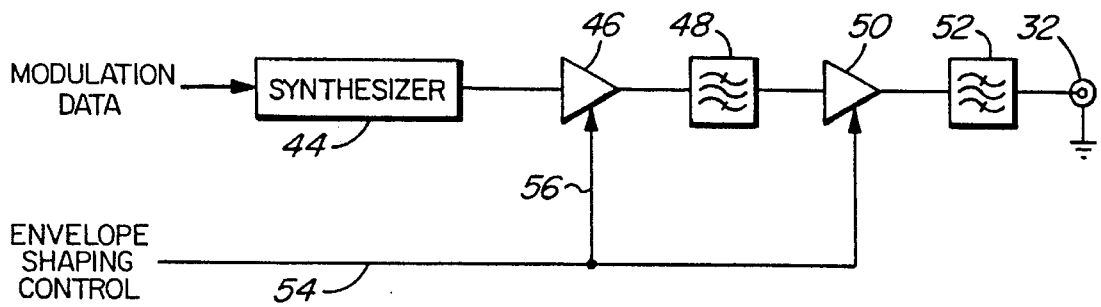
FIG. 6 shows a block diagram of an RF modulator forming part of the base station of FIG. 5.

The RF modulator 30 is shown in greater detail in FIG. 6, and includes a synthesizer 44, connected to receive the output of the data processing converter 26. The output of the synthesizer 44 is connected to an amplifier 46, a bandpass filter 48, a further amplifier 50 and a further bandpass filter 52, the output of which is connected to the terminal 32. Envelope shaping control voltages from the data processor 26 are connected to the amplifiers 46 and 50 through conductors 54 and 56.

Figure 7:
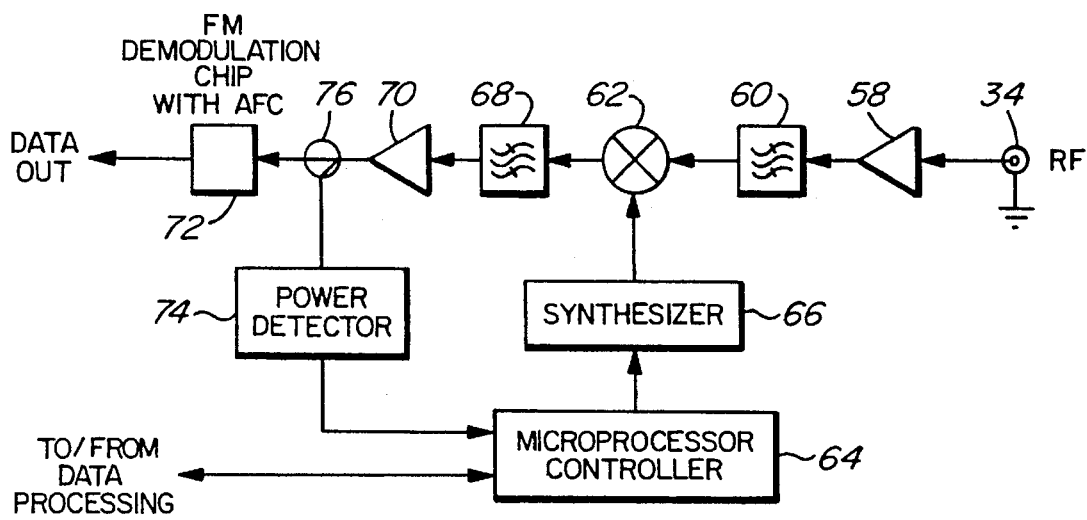
FIG. 7 shows a block diagram of an RF demodulator forming part of the base station of FIG. 5.

The demodulator 36 is illustrated in greater detail in FIG. 7, and comprises an amplifier 58 and a bandpass filter 60 for applying the RF receive signal from the terminal 34 to a mixer 62.

A microprocessor controller 64, connected to the data processing component 26, controls a synthesizer 66, the output of which is connected to the mixer 62.

From the mixer 62, the receive signal passes through a further bandpass filter 68 and a further amplifier 70 to an FM demodulation chip 72, which incorporates AFC for automatic frequency control of the receive signal.

A power detector 74 is connected to a directional tap 76 between the amplifier and the FM modulation chip, and provides an output to the microprocessor controller 64.

As will be apparent to those skilled in the art, various modifications may be made in the above described base station within the scope and spirit of the appended claims.

For example, the ability of the base station to receive signals from the RAD on a continuous basis, when considered with the fact that the handsets send signals to the RAD and base station only in predefined bursts, allows a "RAD-to-base station" communications epoch. Within this epoch the RAD can pass status information to the base station. This status information may, for example, be employed for maintenance purposes or may be for operational use (for example, allowing the base station to "tag" the location of the handset signal and thus to physically locate the caller.

Similarly, there is a "base station-to-RAD only" communications epoch, in which self-test and set-up signals can be passed.

I claim:

1. A method of exchanging telephone signals between a basestation and a mobile cordless time division duplex (TDD) handset, comprising the steps of:

passing transmit signals as frequency division duplex (FDD) signals from said basestation to a remote antenna driver;

converting said transmit signals to time division duplex (TDD) signals at said remote antenna driver;

broadcasting said time division duplex signals to said handset;

receiving at said remote antenna driver TDD receive signals broadcast by said handset, said TDD receive signals including bit clock timing;

converting said TDD receive signals to FDD receive signals at said remote antenna driver;

passing said FDD receive signals to said basestation; and deriving bit clock timing from said FDD receive signals at said basestation and employing said bit clock timing to process said FDD receive signals.

2. A method of exchanging telephone signals between a basestation and a mobile cordless time division duplex (TDD) handset, comprising the steps of:

passing transmit signals from said basestation to a remote antenna driver;

broadcasting said transmit signals from said remote antenna driver to said mobile handset;

receiving at said remote antenna driver signals broadcast by said handset, said receive signals including bit clock timing;

passing said receive signals from said remote antenna driver to said basestation; and deriving bit clock timing from said receive signals at said basestation; and employing said bit clock timing to process said receive signals at said basestation;

said transmit signals and said receive signals being passed between said basestation and said remote antenna driver through separate signal paths at the same frequency.

3. A basestation for a time division duplex (TDD) cordless telephone system, comprising:

a transmit signal path including an analog-to-digital converter for connection to a public switched telephone network;

a timing generator;

a first data processor for providing frequency division duplex (FDD) transmit signals in response to digital signals from said analog-to-digital converter and timing pulses from said timing generator;

an RF modulator for modulating the FDD transmit signals;

said basestation further comprising a receive signal path; and said receive signal path including:

a RF FDD receive signal demodulator;

a symbol synchronizer and bit timer responsive to bit clock timing pules in the receive signals;

a second data processor responsive to said symbol synchronizer and bit timer and said RF demodulator; and a digital-to-analog converter for supplying an analog signal to the public switched telephone network in response to said second data processing means.

4. A time division duplex (TDD) cordless telephone system, comprising:

a cordless handset operating in a TDD mode;

a remote antenna driver for converting TDD receive signals broadcast from said handset into frequency division duplex (FDD) receive signals and for converting FDD transmit signals into TDD transmit signals and broadcasting the TDD signals to said handset;

a basestation operating in an FDD mode; and a signal conduit connecting said basestation to said remote antenna driver;

said basestation comprising an FDD transmit signal path for transmission of the FDD transmit signals to said remote antenna driver and an FDD receive signal path for the FDD receive signals from said remote antenna driver;

said transmit signal path including an FDD transmit signal timer; and said receive signal path including an FDD receive signal demodulator, a receive signal timer responsive to bit clock timing pulses in the FDD receive signals and a receive signal processor responsive to said demodulator and said receive signal timer.

5. A time division duplex (TDD) cordless telephone system as claimed in claim 4, wherein said signal conduit comprises separate first and second signal paths connected to said transmit and receive signal paths, respectively.

6. A time division duplex (TDD) telephone system, comprising:

a TDD handset;

a frequency division duplex (FDD) basestation;

a remote antenna driver responsive to FDD transmit signals from said basestation and TDD receive signals from said handset; and a signal conduit connecting said basestation to said remote antenna driver;

said basestation including a transmit signal path, a transmit signal processor in said transmit signal path, a receive signal path, a bit clock timer responsive to bit clock timing pulses in said receive signals and a receive signal processor in said receive signal path, said receive signal processor being operable, in response to timing from said bit clock timer, independently of said transmit signal processor.

7. A time division duplex (TDD) cordless telephone system, comprising:

a TDD cordless handset;

a frequency division duplex (FDD) basestation;

a remote antenna driver for broadcasting TDD transmit signals to said handset in response to FDD transmit signals from said basestation and for providing FDD receive signals to said basestation in response to TDD receive signals from said handset; and a signal conduit connecting said basestation to said remote antenna driver;

said basestation including:

an analog-to-digital converter for providing digital transmit signals in response to analog transmit signals from a public switched telephone network;

an FDD transmit signal timing generator;

a first data processor means for providing the FDD transmit signals in response to the digital transmit signals from said analog-to-digital converter and in response to said timing generator; and an RF modulator for modulating the FDD transmit signals;

said basestation further including an RF demodulator for demodulating the FDD receive signals from said remote antenna driver;

a symbol synchronizer and bit timer for deriving receive bit clock timing and symbol clock timing from the demodulated FDD receive signals;

second data processor means for processing the output of said symbol synchronizer and bit timer in accordance with the receive bit clock timing; and a digital-to-analog converter for supplying an analog signal to the public switched telephone network in response to the output of said second data processing means.

\* \* \* \* \*